T. P. PAYNE.
METAL WORKING MACHINE.
APPLICATION FILED JAN. 26, 1914.
1,241,248.
Patented Sept. 25, 1917.
8 SHEETS—SHEET 3.
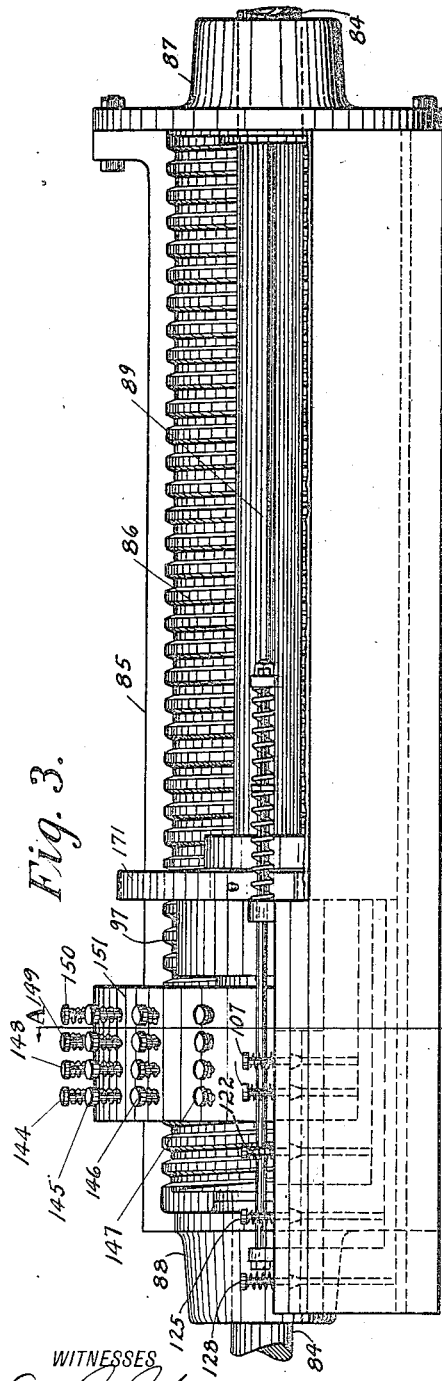
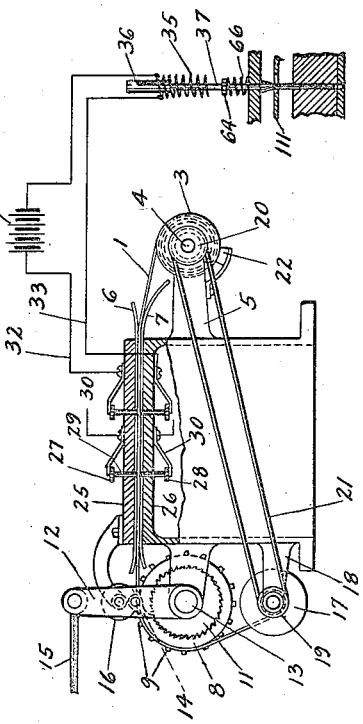

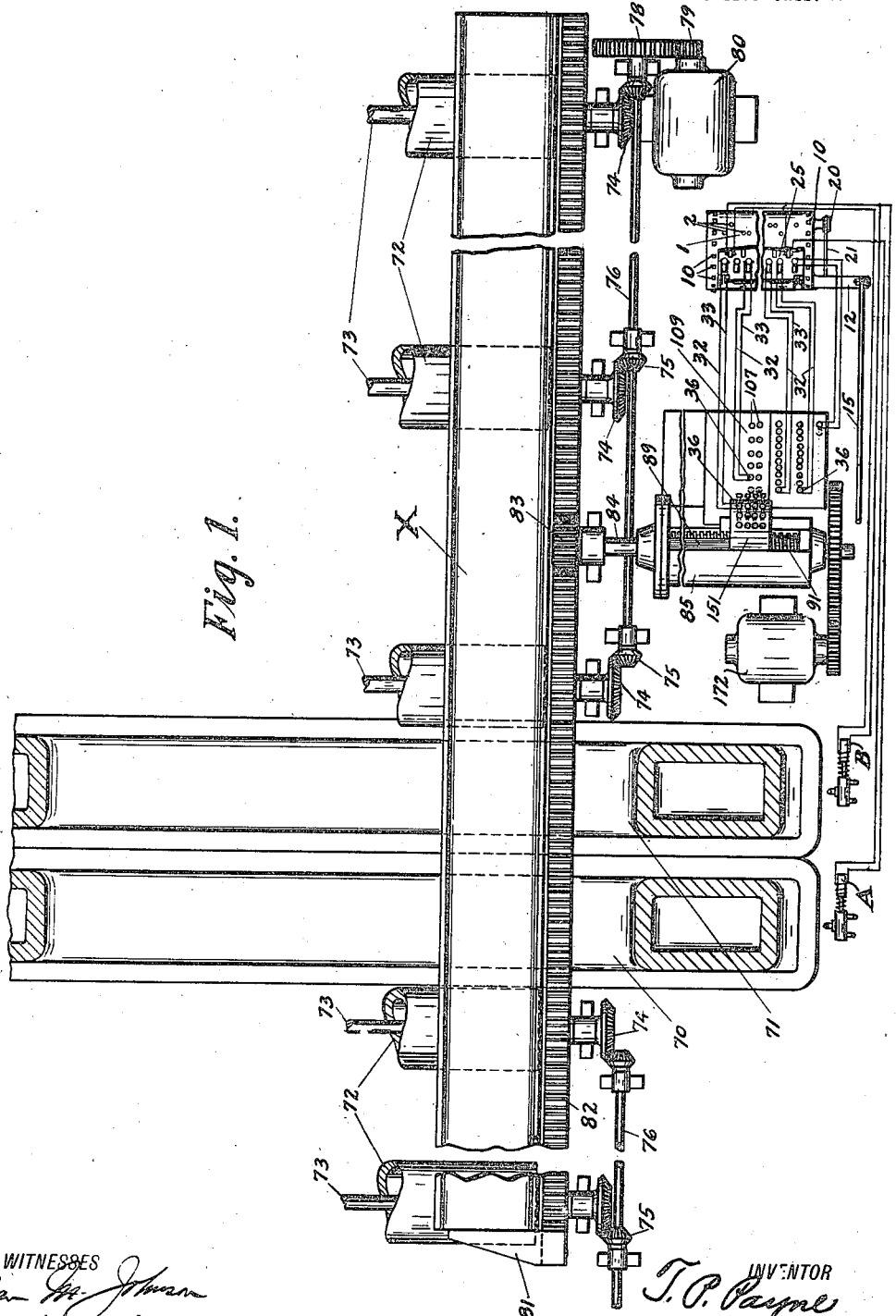

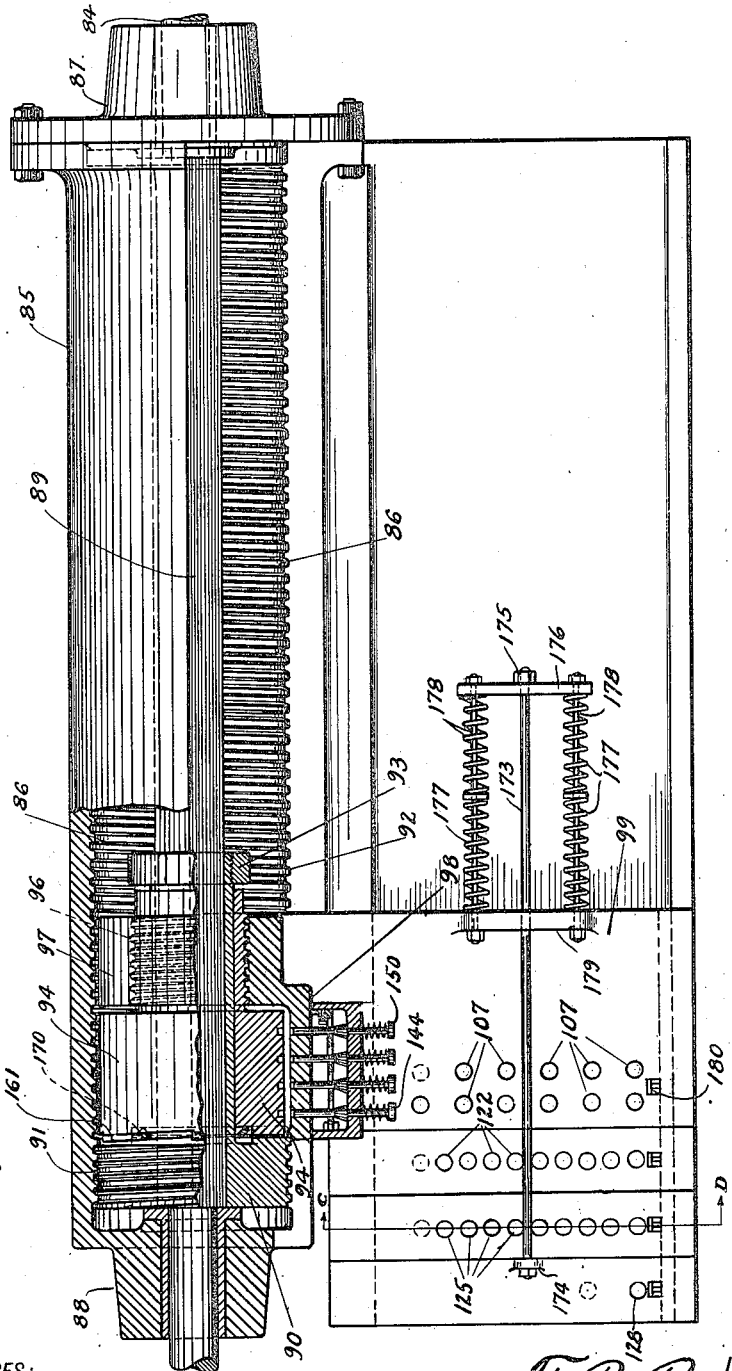

T. P. PAYNE.
METAL WORKING MACHINE.
APPLICATION FILED JAN. 26, 1914.
1,241,248.
Patented Sept. 25, 1917.
8 SHEETS—SHEET 4.
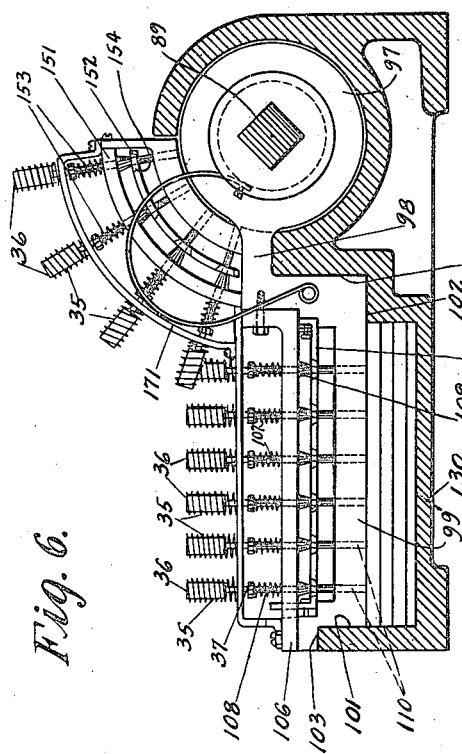
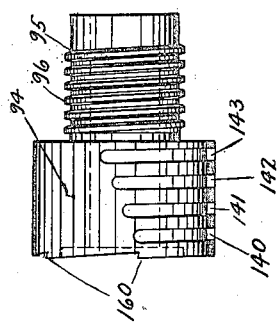
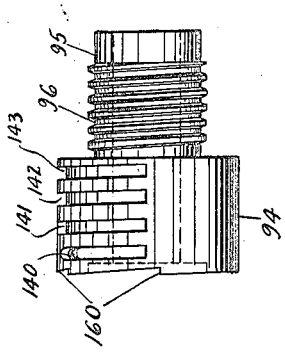
WITNESSES:
INVENTOR
T. P. Payne
BY John D. Morgan
ATTORNEYS T. P. PAYNE.
METAL WORKING MACHINE.
APPLICATION FILED JAN. 26, 1914.
1,241,248.
Patented Sept. 25, 1917.
8 SHEETS—SHEET 5.
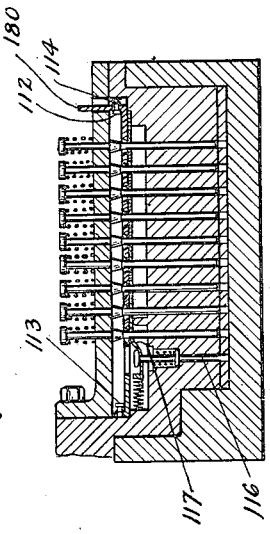
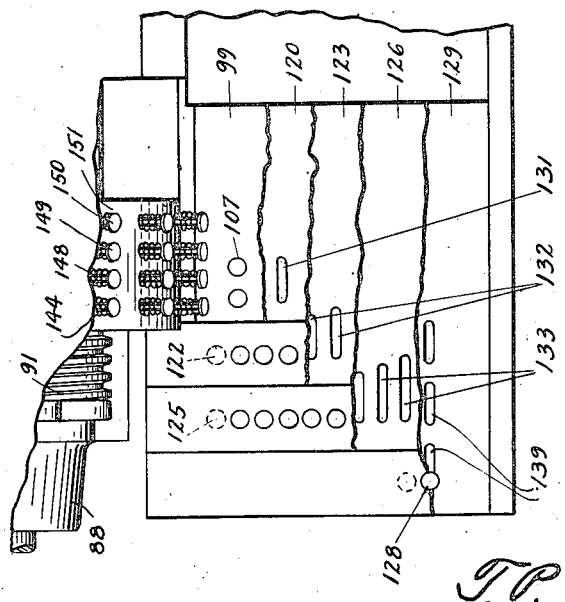
WITNESSES
INVENTOR
T. P. Payne
BY
John D. Morgan
ATTORNEYS

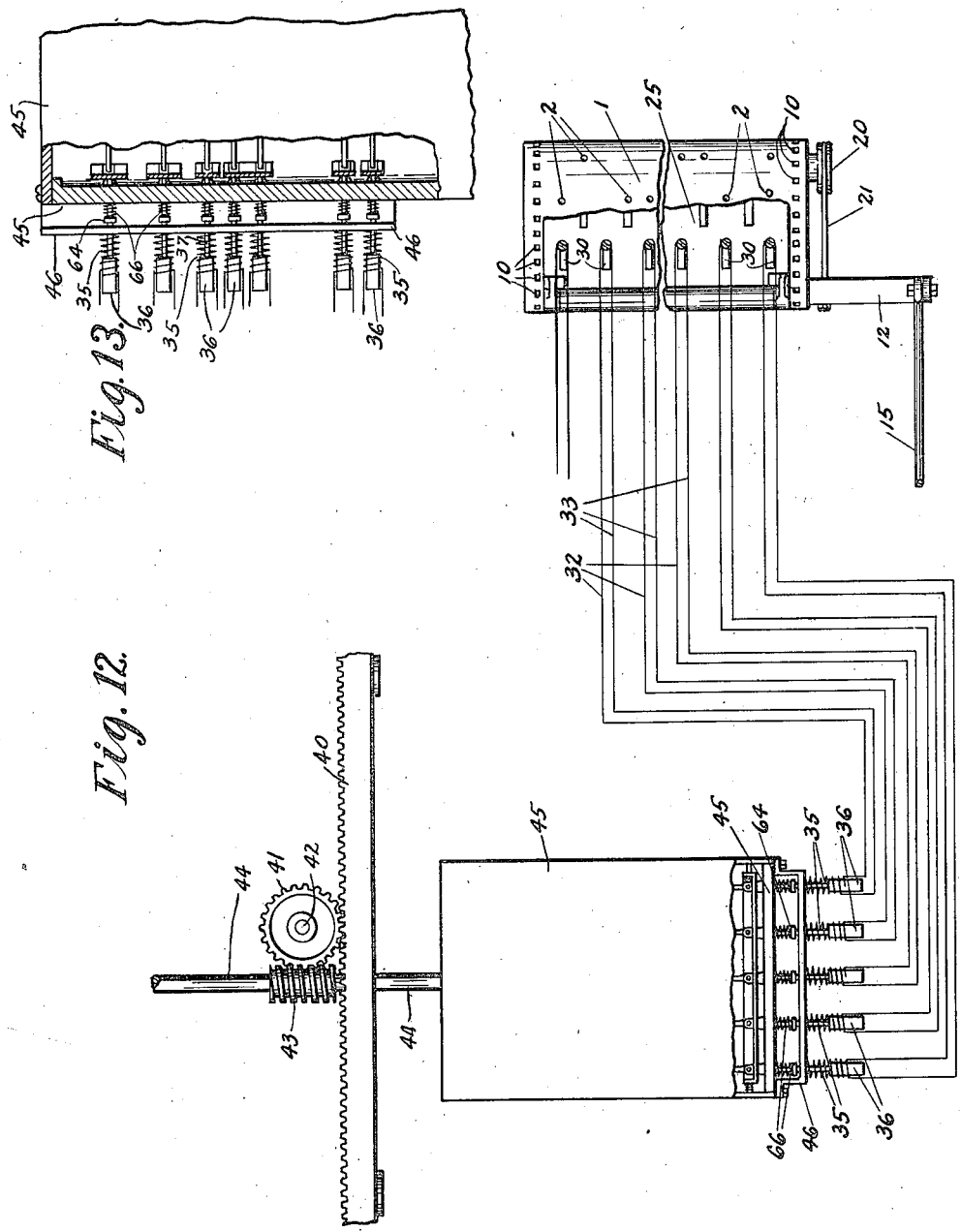

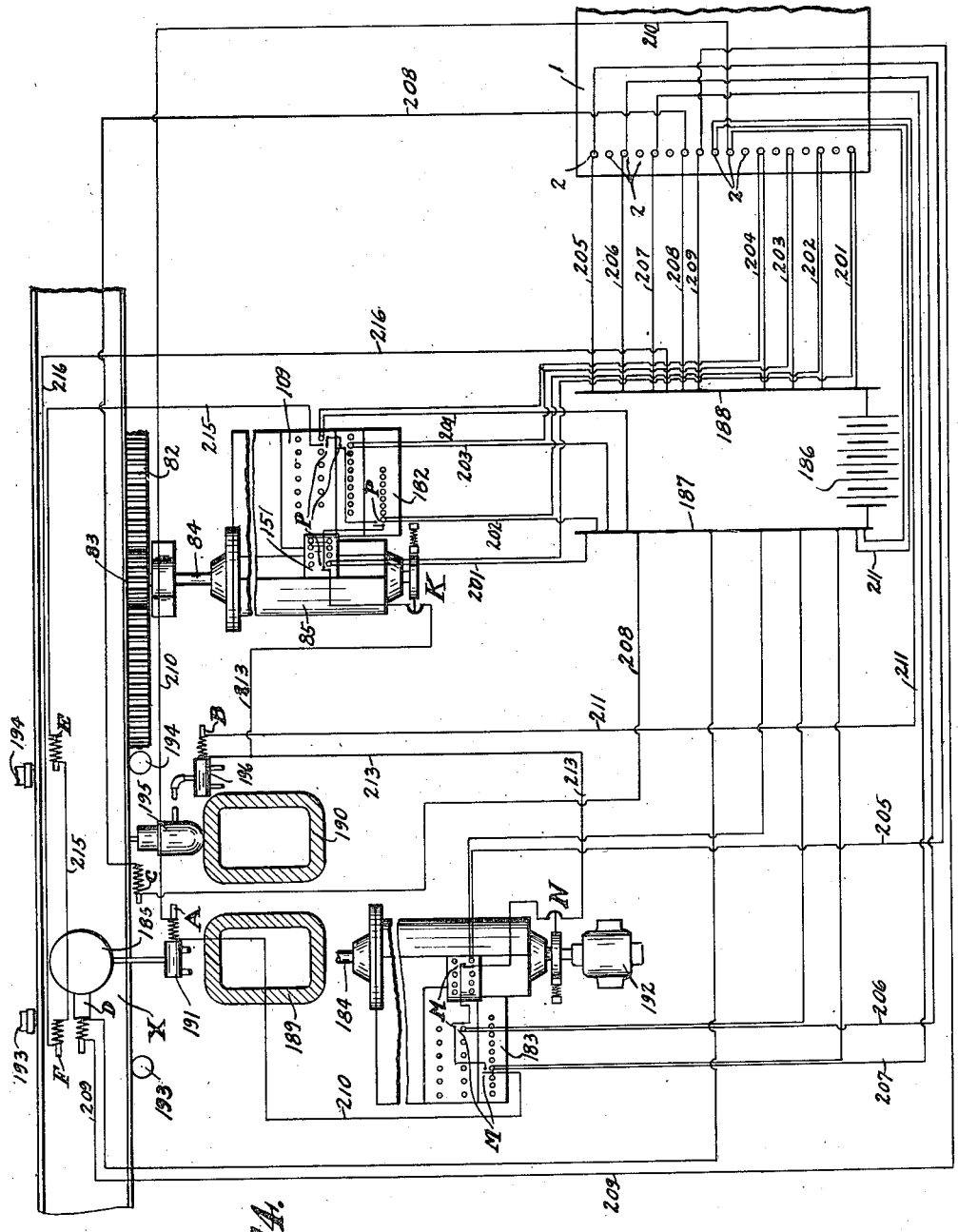

T. P. PAYNE.
METAL WORKING MACHINE.
APPLICATION FILED JAN. 26, 1914.

1,241,248.

Patented Sept. 25, 1917.
8 SHEETS—SHEET 8.

WITNESSES:

INVENTOR
T. P. Payne
BY
John D. Morgan
ATTORNEY

UNITED STATES PATENT OFFICE.

THEODORE P. PAYNE, OF NEWARK, NEW JERSEY, ASSIGNOR TO STEEL UTILITIES, INCORPORATED, A CORPORATION OF NEW YORK.

METAL-WORKING MACHINE.

1,241,248.  Specification of Letters Patent.  Patented Sept. 25, 1917.

Application filed January 26, 1914. Serial No. 814,380.

*To all whom it may concern:*

Be it known that I, THEODORE P. PAYNE, a citizen of the United States, residing at Newark, in the county of Essex and State of New Jersey, have invented new and useful Improvements in Metal-Working Machines, of which the following is a specification.

The invention relates to machines for perforating structural shapes and the like for fabrication, and more especially to machines and means for making the perforations in said work in proper locations or positions with the use of a preliminarily prepared distance record device having therein the distance indications for the perforations to be made in the work.

Objects of the invention are to provide for automatic feeding and positioning of a beam or shape with references to the perforating devices to receive successive perforations in proper position and to automatically correctly feed the beam between perforations; to provide for feeding the shapes or other work through widely varying distances, effecting feeds of a fraction of an inch or feeds of many feet, doing same expeditiously, and in all cases stopping the work with precision and accuracy, under the control of an automatic distance record device; to provide for perforating the different parts of the shapes, such as the web and flanges of I-beams, on a single passage thereof through the machine; to provide a preliminarily prepared distance record capable of governing the automatic location and making of the perforations in the shape, and which record may be completed and verified, and corrected, if necessary, in advance of its actual use in perforating shapes and to provide a machine automatically coöperating with such a distance record device; to provide novel and useful instrumentalities of the kind indicated; to provide especially for the automatic perforating of relatively long and heavy beams and automatically controlling same by an instrumentality in which the distance readings are recorded by perforations in which successive readings are fed to coöperating mechanisms; to provide for so perforating such work by using a distance record device in the form of a perforated strip or sheet adapted to be so fed. These and other objects of invention will in part be obvious and will in part be set forth hereinafter.

The invention consists in the novel parts, constructions, combinations, instrumentalities and improvements herein shown and described.

The accompanying drawings referred to herein and constituting a part hereof, illustrate one embodiment of the invention, and with the description serve to illustrate the principles thereof.

Of the drawings:—

Figure 1, is a general plan of a machine constructed in accordance with the principles of the invention, only some of the circuits and connections being shown and others being omitted for the sake of clearness;

Fig. 2 is an enlarged plan of the distance determining devices with the automatic control or setting devices removed for the sake of clearness and showing the parts thereberneath;

Fig. 3 is an elevation looking at Fig. 2 from the foot of said figure;

Fig. 4 is a detail of the distance record device and showing one of the settable keys controlled thereby;

Fig. 5 is a partial fragmentary plan looking at Fig. 4 from the top;

Fig. 6 is an elevation, with parts in section on the line A—B of Fig. 3, looking in the direction of the arrows;

Fig. 7 is a perspective view of a part of the distance slides and coöperating parts;

Fig. 8 is a fragmentary plan, with parts broken away of the distance slides, corresponding generally to the lower left-hand part of Fig. 2;

Fig. 9 is a vertical section on the line C—D of Fig. 2;

Figs. 10 and 11 are details of a portion of the distance determining mechanism;

Fig. 12 is a fragmentary plan showing a different form of distance determining devices controlled by the distance record device;

Fig. 13 is a fragmentary, sectional elevation of the key mechanism and automatic distance record control therefor shown in Fig. 12, looking at the corresponding parts of Fig. 12 from the right;

Fig. 14 is a diagram of the shape and punch controlling and positioning means including the distance record device and certain circuits.

Figure 15:
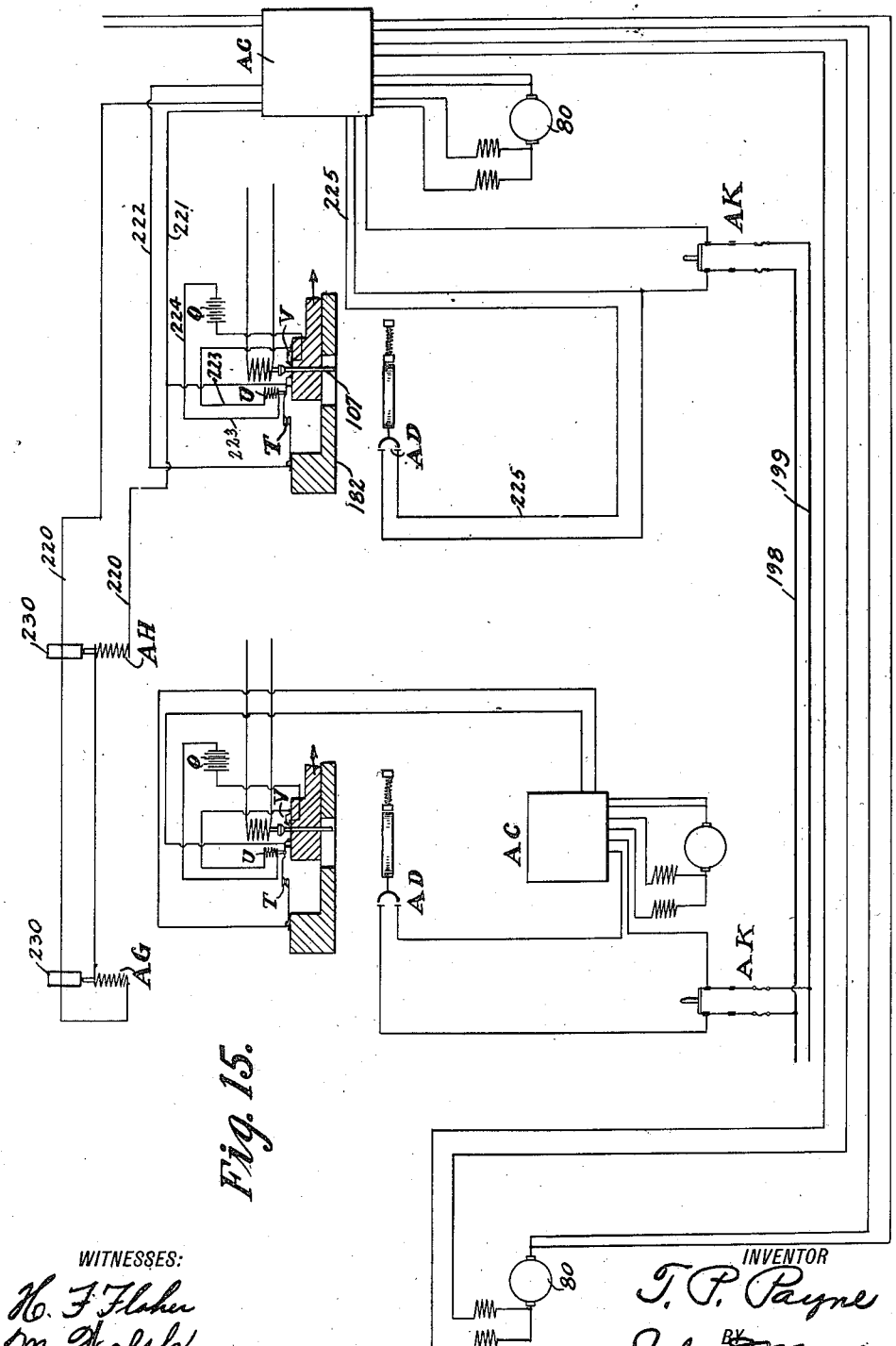
Fig. 15 is a diagram of various parts of the shape traveling devices including the accelerating and retarding devices.

The invention so far as concerns the main aspects thereof is applicable to different forms or kinds of distance determining devices used in machines for operating upon structural shapes, and more particularly, machines for punching rivet holes in the shapes for fabrication.

The invention provides, in connection with such a machine, and coöperating with or as a part of the distance determining means, of a distance record device which automatically sets or controls the setting of the distance determining devices to locate the punchings in the work. The number and relative position of the holes to be made in the shape or beam or preliminary recorded and preferably, all the rivet holes in a particular beam are preliminarily recorded in the distance record device, and are verified or proofed before hand, and revised and corrected if erroneous, so that when the machine is operated under the control or governance of the distance record device, the holes will be punched successively and automatically in the beam or like work, correctly and without error by reason of the precedent verification or correction of the distance record device.

The distance record device in its preferred embodiment has the distance indications in the form of perforations and the perforations are preferably made in a flexible sheet or strip. In the embodied form, also, a line or area across the distance record device, that is transversely of its direction of feed, represents any possible distance reading of the machine for a single setting or reading thereof. That is, a part of the distance transversely of the sheet or strip, or other record device, which may appropriately be termed a sub-area, may represent a distance denomination, and another part of said distance transversely thereof may represent a different distance denomination, and various divisions within each of these distances, or areas, will represent numerals, or quantities of that particular distance denomination.

By way of example, and considering the sheet or strip as the form of distance record device, we may consider theoretically that a large number of holes may be punched therein in alinement transversely of the sheet or strip. Further, by way of example and explanation, we may consider a number of the first holes in the series as representing tens of feet, and there might be five such holes, representing one, two, three, four and five, tens of feet. A number of the next occurring holes in the theoretical series would represent feet, and we could have ten such holes, representing say zero, one etc., feet, up to nine. A number of the next succeeding holes could represent inches, and there could be correspondingly twelve such holes, and in like manner, there could be another series of holes for all the required sub-divisions of an inch.

In practice in an actual setting, and in the corresponding perforations made in the transverse line, only one perforation for each distance denomination would be required, and so only one hole would be actually punched in the proper position for the particular value or number of units to be used in the particular distance denomination. In practice, each transverse line of the sheet or strip would thus have a series of perforations selectively made therein in such a location or position as to give the right number of tens of feet, of feet, of inches, and fractions of an inch. The distance record device, such as the sheet or strip may be fed up intermittently between successive settings of the machine, and while punches or other work is being done on the previous setting.

So far as concerns the broader features of my invention, and in many aspects thereof, different forms of distance determining devices may be employed, and in the exemplified embodiment, I have shown my invention applied to the form of distance determining devices shown in my copending application, Serial No. 704,819, filed June 20, 1912, and also, I have shown same applied to a form of distance determining devices shown in application Serial No. 824,385, of L. A. Hawthorne, filed March 13, 1914.

The embodied form of distance record device comprises a long sheet or strip 1, adapted to be fed or run through a mechanism coöperating therewith to recognize the distance indications or values recorded in the strip 1 and to govern the movements and positions of the shape or other work in accordance therewith so that the holes will be punched therein in accordance with the indications of the record device.

The strip 1 has distance indications consisting of perforations so located transversely of the strip as to indicate distance denominations and values or quantities of such denominations, as previously explained.

In the embodied form of coöperating mechanism the strip 1, which may carry the preliminarily made perforations for the entire shape or beam or like piece of work, may be rolled into a roll 3 supported upon a reel or shaft 4 rotatably mounted in a suitable support such as a bracket 5. The strip 1 runs between suitable guides 6 and 7, and over a roller 8, which roller is provided with sprocket teeth 9, said sprocket teeth fitting into or meshing with sprocket holes 10 in the margins of the strip 1. A suitable feed device operating upon the feed roll 8 is provided, and as embodied, it comprises a ratchet wheel 11 fixed to rotate with the feed roll 8. A reciprocable arm 12 is mounted loosely upon the shaft or bearing 13 of the roll 8, and a spring pressed pawl 14 is pivotally mounted upon the arm 12, and engages the ratchet teeth of the wheel 11.

Suitable means are provided for reciprocating the arm 12 for each operation of the tool-equipped means to intermittently feed forward the strip 1 for a new setting of the distance determining devices. As embodied, a pivotally connected rod 15, connects the arm 12 to any suitable part of the mechanism (not shawn). A presser roll 16, or a plurality of such rolls may be used to keep the strip 1 firmly in place upon the feed roll 8.

Suitable devices may be provided for keeping the strip taut and rewinding it. In the embodied form, a reel 17 is mounted upon a bracket 18 and said reel has fast to its shaft a pulley 19. A pulley 20 is shown fast to the shaft 4 of the reel for the distance record strip. A belt 21 passes over the pulleys 19 and 20. A drag or brake 22 may be used on the roll 3, if desired.

The manner of operation of the mechanism just described is as follows: The arm 12 is rocked to the right and back again to the left in proper time relation to the operation of the punches or other tool-equipped means and the pawl 14 thereby engages a new ratchet tooth on the wheel 11 and gives the proper amount of feed to the feed roll 8. This draws the strip 1 toward the left in Fig. 4, unwinding it from the roll 3, the brake 22 preventing unnecessary slack in the strip. The pulley 20 is larger than the pulley 19, and thus the used portion of the strip 1 is wound upon the reel 17, the belt 21 slipping as the size of the two rolls varies, the slack at the forward end of the strip 1 being always kept wound on reel 17.

The embodied form of means coöperating directly with the distance record device, that is the strip 1 for recognizing its indications and positioning the work accordingly, is electrical, although so far as concerns many features of the invention said means might be mechanical or pneumatic, or of other construction or principle of operation. In said embodied form, the strip 1 travels or is fed between plates 25 and 26, which support pairs of electrical contacts 27 and 28. Said contacts comprise pins 29 working in apertures in the plates 25 and 26, said pins being impelled toward each other by springs 30, mounted upon the plates 25 and 26. These devices may be properly insulated, or the plates 25 and 26 themselves may be of insulating material. Each pin of an opposed pair, through the corresponding springs 30, or otherwise, are electrically connected, respectively, to the two branches 32 and 33 of an electrical circuit, which circuit comprises any suitable source of power 34, shown conveniently at Fig. 4.

So far as concerns many features of the invention, the distance controlling and determining devices may be of various forms, but as one feature of the invention, a keyboard is employed, which may be utilized with the automatic control or may be used separately if desired. In Fig. 4 is shown a single key 64 of the keyboard of a distance determining device, and in operative relation therewith is shown a solenoid 35 in circuit with the wires 32 and 33. The core 36 of the solenoid has connected thereto a rod 37, in operative relation to the key 64, the spring 66 on the key stem serving to move back the solenoid core when the circuit is broken.

In said embodied form there will be a pair of the contacts 27 and 28 for each possible position of a perforation in the strip 1, and these will be arranged in a line transversely across strip 1. If it is found structurally advisable, the pairs of contacts may be staggered to give more room for the mechanism, and the transverse line of perforations in such case will be correspondingly staggered instead of being in a straight line.

In accordance with certain aspects of the invention as previously indicated, the distance record device and the coöperating devices are adapted to coöperate with a keyboard machine, that is with a machine having a keyboard, which may be also manually settable by an operative. According to one feature of the invention, the automatic control is removable from the keyboard so that the distance determining devices may be operated either automatically by the distance record device or strip or may be set by an operative from readings on a blueprint, schedule or other source.

The embodied form will first be described as comprising these features of the invention and as applied to the form of distance determining devices shown in my copending application for patent, Serial No. 704,819. Only a portion of the drawings of said application will be shown herein, sufficient to explain the utilization of that particular form of distance determining mechanism with my present invention.

Referring by way of example to Fig. 12, the rack traveling with the work is indicated by reference numeral 40 (which rack is the same or corresponds to rack 4 in mv said application, Serial No. 704,819). Meshing with the rack 40 is a pinion 41 mounted on the shaft 42. Fixed also on shaft 42 is a worm wheel (not shown), which worm wheel meshes with a worm 43 on shaft 44 (the foregoing mechanism corresponding to the pinion 9, shaft 11, worm 15 and shaft 16 of my said copending application). The casing for the distance determining means is indicated by reference numeral 45. The upper most row of keys is indicated herein by reference numeral 64, the same as in my said copending application. The restoring springs for the key 64 are indicated by reference numeral 66, corresponding also to my said copending application.

Detachably mounted upon the face 65 of the casing is a frame 46, said frame supporting a series of solenoids 35, corresponding to the various keys. The cores 36 of the solenoids are provided with rods 37 coöperating with the respective keys 64 in the manner shown also in Fig. 4 of the drawing, and the entire complements of keys may be so equipped. The distance record device controlling the keyboard is shown in Fig. 11, and has been already described in detail.

The application of my present invention to this particular distance determining means will be clearly understood from the foregoing description without further elaboration. The frame 46 may be removed when it is desired to operate the keys manually by an operative.

Referring to the form of device shown in Figs. 1 to 10 inclusive, the position of the tool-equipped means is indicated generally by the housings 70 and 71. The housing 70 may be regarded as the location of either a flange or web punch and the housing 71 as the location of the other. The beam or shape is indicated by X. The shape $x$ rests upon a series of driven rolls 72, turning with their shafts 73, on which shafts are bevel gears 74. Meshing with these gears 74 are bevel gears 75, fixed upon a shaft 76, driven in a suitable manner, as through a train of gears 78 and 79 from the motor 80. Traveling along the pathway of the shape is a member in definite relation thereto and adapted to stop the shape, which member is controlled by the distance determining devices to permit and prevent the travel of the shape as impelled forward by rolls 72, so as to position it relatively to the punches or tool-equipped means, so that the perforations will be properly located in the shape $x$. As embodied, said means comprise a head 81 with which the end of the beam is in contact, and fixed thereto and traveling therewith a longitudinally slidable rack 82 extending along the side of the beam $x$.

The rack 82 has suitable connections to the distance determining device, such as a pinion 83, which meshes with the rack 82, said pinion being fixed to the shaft 84. The shaft 84 passes through the casing 85 and is journaled to rotate in bushings 87 and 88 in the ends of the casing 85.

Within said casing the shaft 84 has a square portion 89 or of other equivalent shape. The casing 85 is provided with an internal thread 86, and mounted on the squared portion 89 of shaft 84 is a nut 90 having an exterior thread 91 meshing with the internal thread 86 of the casing 85. Extending to the right, in Fig. 2, from the body portion of the nut 90 is an integral sleeve 92 squared internally to fit the shaft 89 but of cylindrical external form. Threaded or otherwise fastened on the end of the sleeve 92 is a collar 93. Sleeved or journaled upon the sleeve 92 is a cylindrical member 94 (see Figs. 2, 10 and 11), which member 94 is provided with an integral sleeve or extension 95 extending to the right in Figs. 2, 10, and 11. Upon this cylindrical sleeve 95 is formed an external thread 96.

Encircling the thread 96 and having an internal thread meshing therewith is a traveling nut 97, said nut 97 having fixed thereto a neck or extension 98. Fixed to or integral with the neck 98 is a plate 99 which is slidable between guides or abutments 100 and 101, and which is supported upon a bearing surface 102, and upon a bearing surface 103. To avoid friction and excessive wear ball or roller bearings may be provided between the plate 99 and its bearing surfaces.

Carried upon the plate 99 is a key-support 106 having openings therein in which work or reciprocate a series of keys 107, preferably arranged in a double row for convenience and compactness of construction. Said keys also work in apertures 110 in the plate 99. Said keys are held in retracted position by springs 108.

Beneath the support 106, the keys 107 have connoidal enlargements 109. Just below the connoidal enlargements on the key stems is a spring-pressed plate 111, mounted to slide longitudinally of itself on supporting pins 112 and 113, and being yieldingly impelled in one direction by a spring 114 coiled about the pin 112. In the plate 111 are apertures, which just permit the connoidal enlargements 109 to pass therethrough. These apertures are yieldingly held off center with respect to the enlargements 109, the smaller end of which, however, are within the apertures. When a key is pressed down, the plate 111 will slide against its spring to permit the enlargement 109 to pass through the aperture, and after the enlargement 109 has passed through the aperture, the plate will spring back, locking the key in set position until another key is actuated. The actuation of the second key will momentarily center the plate again, as already described, which permits the enlargement 109 to pass through its aperture and permits the release of the first key under the action of its spring 108. A locking pin 116, with a coöperating sliding plate 117, are provided the operation of which will be described later.

Beneath the plate 99 is a plate 120 having an enlarged portion 121 carrying a set of keys 122, which are generally similar to the keys 107, previously described, and need not be further described in detail. Beneath the plate 120 is a plate 123, having a portion 124 carrying a bank of keys 125 which may be of similar construction to those already described. A plate 126 lies beneath the plate 123 having a part 127 carrying keys 128. Beneath the plate 126 is a plate 129 fast upon the bed 130.

In the plate 120 are a series of slots 131 of different lengths located beneath the various keys 107 of plate 99 (see especially Fig. 8), into one of which slots the corresponding key of the bank 107 carried by the plate 99 is projected when said key is set. Thus the plate 99 will travel alone until such set key 107 reaches the end of the coöperating slot 131, after which the plate 120 will be moved with the plate 99. The slots are graduated in length to correspond to the distance value of the key coöperating therewith. That is, for example, where the plate 99 corresponds to inches of travel of the work, the slot for say ten inches, would be longer than say, for one inch. Where two keys coöperate with a single slot (as is shown in Fig. 7 for the plate 99, keys 107 and the slots in plate 120,) each pin represents a different distance value or setting dependent upon its position with respect to the position of the slot as will be clear from the drawing, that is if the pin near the head of the slot is set, the plate 99 will have relatively farther travel before starting the plate 120 than if the other key coöperating with the same slot were set.

The plate 123 is provided with a like series of slots 132, and the plate 126 with a similar series 133. In the plate 129 are slots 139 which selectively position the shape relatively to either the web or flange punches. The various series of keys may represent such distance denominations as may be advisable and convenient for the particular design or embodiment and in the illustrated mechanism keys 107 represent inches, the keys 122 represent feet, while the keys 125 represent tens of feet. The keys 128 represent a setting for either the web punch or flange punch or other tool-equipped means when these various punches are arranged lineally or successively along the path of the work, as shown generally in Fig. 1. That is, when one of the keys 128 is set, it will position the work relatively to one of the punches in accordance with the set distance reading. When the other, or another, key 128 is set, it would position the work for the other punch, but according to the same distance reading. The distance record sheet would have perforations for automatically setting either key 128 and so controlling the position of the work relatively to either punch.

According to one feature of the invention, the ultimate or finer readings, which in this case would be fractions of an inch, are made on the cylinder 94. The setting in the present embodiment on the cylinder 94 and coöperating devices is for sixteenths of an inch, and there are accordingly formed in the surface of the cylinder 94 four slots helically arranged and of the same pitch as the internal thread 86 of casing 85. There are four keys coöperating with each slot. The slots in the cylinder 94 are numbered respectively 140, 141, 142 and 143. Coöperating with the slot 140 are a series of keys 144, 145, 146 and 147. Coöperating with the slot 141 are a series of keys collectively indicated by 148. A series of keys collectively indicated by 149 coöperate with slot 142, and a series of keys 150 coöperate with the slot 143.

These various series of keys are mounted in a plate 151 and have a locking and restoring plate 152 and are provided also with restoring springs 153 which are of similar construction and principle of operation to those already described. These various series of pins for fractional settings also work in apertures in plate 154 which is fixed to or integral with the nut 97.

On the face of the cylinder 94 is shown a series of crown teeth (see especially Figs. 2, 10, and 11) 160. A corresponding series of crown teeth 161 are on the adjacent face of the nut 91 (see Fig. 2). These teeth 160 and 161 are of the same pitch with thread 86, and are adapted to pass into and out of engagement with each other, as will be later more fully described.

The manner of operation of the mechanism just described is substantially as follows. The shape $x$ is impelled forward by the rollers 72 against the head 81. A distance setting is made by setting the proper keys, as by way of example, one of the pins in the tens of feet, also one of the pins in the feet series, together with one of the pins in the inch series, and one of the pins in the fractional parts of an inch series. This would provide for a feed of the work for a corresponding distance. The mechanism may be constructed so that the setting of the pin representing the fraction of an inch will permit the mechanism to start into operation. The head 81 is thus permitted to travel, and as it travels, the shaft 84 will be rotated through the connections already described.

As the shaft 84 rotates, the nut 90 on the squared part 89 of the shaft 84 will be rotated, and by reason of its thread 91 intermeshing with the thread 86 of the stationary casing 85, the nut 91 will travel toward the right, referred to Fig. 2. The intervening mechanism and connections up to the collar 93 travel with the nut 91. Thus the plate 99 is slid along its guideways. When the key and pin 107 which has been set reaches the end of the corresponding slot 131, the slide 120 will be started into movement and will then travel with the plate 99 and nut 91 and the parts just described. Correspondingly, the plate 123 will start into movement when the set key and pin 122 reaches the end of the slot 132. Also the plate 126 will start into movement when the corresponding key and pin 125 reaches the end of the corresponding slot 133. The plate 129 being stationary, the plate 126, and correspondingly the entire structure back to the nut 97 are brought to rest when the set key 128 reaches the end of slot 139 in plate 129. If any particular denomination is not used, the locking pin 116 will cause that particular slide and the one underneath to start and travel together, thus allowing no travel of the work for such denomination when no pin is set. The sliding plate 111, or other corresponding plate releases the locking pin, and the plate 111 can be slid by hand to release the locking pin by means of the projection 180 at one end of plate 111. The mechanism is so proportioned that the crown teeth on the cylinder 94 and the corresponding crown teeth on the nut 91 have their locking faces substantially in alinement or in position for engagement one with the other.

The cylinder 94 is now prevented from lineal travel along the shaft 84 except as it may be rotated, and its rotation through the action of its thread 96 intermeshing with the internal thread of the nut 97 will again give it translational travel, that is, movement along the shaft 84 to the right in Fig. 2. The nut 91 and the cylinder 94 are normally held out of mesh by the spring 170.

When any one of the pins coöperating with the slots in the member 94 has been projected into its slot, and the various sliding plates have reached the ends of their travel, respectively, by reason of the pins in the various slots in said sliding plates having reached the ends of their respective slots, and the nut 97 is thus at rest, it will be understood that by reason of the shape and location of the slots in the member 94 the further movement thereof will be rotational as well as translational, and will measure from the last integral inch setting. As the nut 90 rotates farther, its teeth 161 pass into line and into mesh with the teeth 160 on cylinder 94, through the yielding of spring 170. As cylinder 94 turns, its sleeve 95 screws into nut 97 and thus allows for the necessary advance of nut 90 which has its thread 91 in mesh with the thread 86 of casing 85. The set pin reaching the end of the corresponding slot in cylinder 94, said cylinder is brought to rest and the nut 90 is likewise brought to rest in exactly the correct position by reason of the faces of its teeth 161 coming against the corresponding faces of the crown teeth 160. This brings shaft 84, the head 81 and also the beam to rest, in exact correspondence with the set distance reading.

A motor 172 connected to drive shaft 84 restores the head 81 to exact starting position, which as will be clear, restores all the other parts, and a spring 171 insures the rotation of drum 94 to starting position on the integral inch. One of the keys and pins coöperating with its slots may serve to hold drum 94 in that position until there is a fractional setting by one of the other pins. The motor 172 may be operated automatically from the distance record device by a suitable circuit controlling a solenoid or magnetic switch, such devices being similar to those shown and described and employing any desirable or usual form of electrically operated controlling switch for the motor 172. If desired, the motor 172 may be controlled by an operator, or automatically from some other part of the machine.

Means are provided for bringing together the sliding plates after a distance setting preparatory to making a new distance setting. In the embodied form of such means a spring device is utilized and comprises a rod 173, fixed at lug 174 to the part 127 which is fixed to plate 126. Against nut 175 at the other end of rod 173 works a crosshead 176, which head is under pressure from springs 177, conveniently coiled upon supporting rods 178 held by lug 179 on plate 99 and also slidably supported in head 176. The springs 177 are compressed as the sliding plates pay out in making a distance setting, and said springs draw the plates together again when the set keys of the various series are released by the actuation of the respective slides 111, which may be operated in any suitable way, as by hand by pressing on the upturned ends 180 of the various slides 111.

In Fig. 14 of the drawings is shown a wiring diagram in connection with fragmentary showings of certain parts of the machine, the same exemplifying a system, or part of a system, adapted or suitable in connection with controlling a machine of this kind by means of a distance record device such as the perforated sheet hereinbefore described.

The distance record sheet is indicated by reference numeral 1, and the perforations therein by reference numeral 2. Two distance determining devices are shown, one of said devices controlling the traveling and stopping of the shape $x$ longitudinally, that is in the direction of its travel with respect to the punches or like tool-equipped means. The other of said distance determining devices controls the transverse or crosswise positioning of the shape and punch relatively to each other, and as embodied it controls the travel and stopping of the punching device transversely, that is, crosswise, to locate the perforations transversely in the web of an I-beam, or like part of some other shape.

The distance controlling device shown at the right in Fig. 14 corresponds generally to the distance determining device shown in Fig. 1 and other figures, and has like reference numerals applied thereto and is indicated generally in Fig. 14 by 182, and will require no detailed description at this point. The other distance determining device, shown to the left in Fig. 14, may be of like or similar construction, and is indicated generally by reference numeral 183 and likewise needs no further detailed description at this point. This distance determining device 183 is connected by means of its shaft 184 and suitable connections (not shown in detail, but shaft 184 corresponding to shaft 516, in my copending application S. N. 790,085, and the cylinder of punch 185 corresponding to cylinder 480 in said copending application) to travel the web punch 185 to and fro transversely of the shape $x$ to properly locate the perforations transversely or across the shape.

In the wiring diagram, a source of electrical energy is indicated by 186 with distributing or main lines 187 and 188. The housings or general mounting for the traveling web punch (shown fragmentarily) is indicated by 189. The housing or frame for one of the opposed flange punches is likewise fragmentarily indicated in Fig. 14 by reference numeral 190.

The circuits 201, 202, 203 and 204 are provided with contacts or like devices coöperating with perforations 2 in sheet 1 to set and otherwise control the distance determining device for the longitudinal feed of the shape $x$. It will be understood that such number of the circuits and coöperating means will be used as may be required. Circuits 205, 206 and 207 similarly operate the other distance determining device, which governs the transverse travel and position of the work, a proper number of such circuits being utilized.

Suitable devices for securing or calling into operation the desired number of punches are provided, and circuits 208 and 209 are designed for this purpose, controlling respectively the gag solenoids C and D. Circuit 210 controls the starting or calling into operation of the web punch and its safety device. When the proper perforations are made in the distance record sheet, this circuit is energized and solenoid A actuates a suitable device shown as a hydraulic valve 191 suitable for controlling a hydraulic punch. The circuit then passes through auxiliary contacts M in the keyboard of the distance determining device for the web perforations, said contacts being arranged so that a complete setting in this keyboard is necessary to close the circuit.

When a complete setting has previously been made in said keyboard, and the mechanism is consequently in condition to properly locate transversely of the shape $x$ the perforation about to be made in accordance with such setting of said distance determining device, the current then passes through a contact N which is closed by the stopping of the motor 192, which drives this transverse distance determining device. The current then passes through line 213 to contact K which contact is closed by the stopping of the other, or longitudinal, distance controlling device 182, and may be of any suitable form for this purpose. The current then passes through auxiliary contacts P in the keyboard of this longitudinal distance determining device 182, which auxiliary contacts are arranged so that the completion of a distance determining setting in this keyboard is necessary to close the circuit. The current then passes through line 215 and through solenoids E and F. Said solenoids E and F operate opposed pairs of gripping or alining rolls 193 and 194, which rolls serve to aline the work transversely at the point for punching the web, in order to insure the shape being maintained in proper position with respect to the mechanism and thus properly locate the perforations in the work. The current then passes through line 216 back to the distributing line 188, and to the contacts at sheet 1, and so on to complete the circuit.

Thus means are provided for insuring that a punch will not be operated until there has been a proper setting of distance determining devices for the desired longitudinal and transverse positioning of the shape and punch so that the perforations will be properly located in the web at the point corresponding to the setting of the distance determining devices. Also such setting will be controlled by and will be in correspondence to the perforations in the distance record Sheet 1. Said devices also embody means for insuring the sequential operation of the shape perforating means after the shape has been so positioned. Means are also embodied whereby the beam is necessarily and preliminarily correctly positioned transversely of the shape, by the control of the alining or gripping cylinders 193 and 194 controlled by the solenoids E and F.

In connection with the control of the flange punch 195, the circuit 211, similarly controlled from the distance record sheet 1, passes through solenoid B, which operates a suitable control for the flange punch 195, such as a hydraulic valve 196. The current then passes through line 213, and through contact K, which contact is on the shaft of the longitudinal distance determining device 182, previously referred to and is controlled by the starting and stopping of said device. The circuit then passes through auxiliary contacts P at the keyboard of the longitudinal distance determining device 182, the circuit being closed at this point upon the completion of a distance setting upon said device 182. The circuit then passes through line 214, 215 to the solenoids E and F of the alining rollers 193 and 194, and thence through line 216 to the source of current and back to the contact at the distance record sheet 1.

Means are thus provided by the foregoing for insuring a complete setting of the longitudinal distance determining devices before the flange punch mechanism can be operated, and for securing sequential operation of the distance determining device and of the perforating devices, respectively. The flange punches, may be in opposed pairs although but one is shown in the drawing, and it will be understood further that the expressions web punch and flange punch are explanatory and not limiting as applied to the invention.

Means are provided by the invention for accelerating and retarding the movement of the shape in connection with the distance determining devices. In accordance with this feature of the invention, as embodied, shortly before the predetermined point in the travel of the beam is reached which corresponds to the setting of the distance determining device slowing down means are brought into operation to retard the shape and decrease its momentum.

In Fig. 15 of the drawings is shown a wiring diagram applicable or suitable for such control of the means for traveling the shape longitudinally and for stopping it in its longitudinal travel in proper position to be operated upon by the perforating devices.

In this figure, wires 198 and 199 are distributing or bus wires from any suitable source of electric energy. The switch AK may be operable by the operator of the machine or otherwise. When this switch is closed, current flows to series parallel controller AC, whereupon the two motors 80, which motors drive the rolls 72 (Fig. 1), are connected in series, gradually bringing them up to speed by automatically varying resistance. Thereupon, the motors are switched to parallel and accelerated to full working speed. When a distance determining key 107 (which may be any desired distance determining key) is set for the corresponding distance, it also closes a suitable circuit closing device V. The sliding plate will travel in the direction shown by the arrow, and the limit of the distance to which the distance determining device 182 is set, may be regarded as illustrated by the relation of key or pin 107 and its slot.

A contact device T is in a circuit for varying the resistance or current control of the motors 80 (two such motors being shown, one for each end of the machine) whereby said motors are slowed down as the shape approaches the point or distance for which the longitudinal distance determining device 182 is set. The two branches of this motor controlling circuit are indicated by reference numerals 221 and 222, and connect to the controller AC for the motors 80.

For the purpose of making and breaking said circuit at contact point T, a circuit 224 is provided having a suitable source of electrical energy Q, and a solenoid U. When a distance determining pin 107 is set, said pin closes both circuits at V. Thereupon the uppermost member of the contact device T is moved into circuit closing position. The time of closing the circuit at point T is determined by the movement of the superimposed sliding plates and the position of the set pins 107 in their slots. When the slowing down device makes contact at T the current flows through said circuit 221 and 222 to the controller AC, as already indicated, and said controller is operated to retard the motor 80 (corresponding to the motor 80 in Fig. 1), whereby the motor is brought down to slow speed preparatory to bringing the shape to rest at the desired point for which the distance determining devices have been set.

When the distance determining device comes to rest the switch AD (on shaft 84) automatically opens, cutting the current off from the motors 80 through circuit 225. Said switch AD may be operated by the shaft of the distance controlling device as above described or may be connected in suitable manner to the current controller AC.

The starting current is also sent from the controller AC over circuit 220, 221 to solenoids AG and AH, which solenoids actuate pinching rolls 230, which pinching rolls grip the shape when the rolls 72 are running and serve to hold it firmly to these rolls and thus assist in keeping the shape accurately to the head 81.

Similar devices are shown applied to the means or mechanism for positioning the shape transversely and operate in a generally similar manner to accelerate and retard the travel of the web punching device. They have, therefore, been indicated by the same reference numerals and need not be described in detail.

It will thus be understood that in connection with settable distance determining devices, and in connection with such devices automatically controlled by a distance record sheet, means have been provided for controlling the travel and rate of travel of the shape or other work whereby it is brought up to speed and then retarded preparatory to being stopped by the mechanism controlled by the distance determining devices to properly position the shape or like work relatively to the perforating means.

In view of the various descriptions of operation of the various mechanisms and groups of mechanisms no general statement of operation at this point will be necessary. It will be understood that as the strip or sheet 1 is fed intermittently and automatically through the machine the arm 12 is actuated through the rod 15, which rod is actuated by connections to the punch or some part reciprocating or otherwise moving in determinate relation thereto, and thus a new part of the strip 1 with a new distance reading will be fed up between the contact pins 27 and 28. The perforations in the strip 1 will complete the selected circuits, and the corresponding keys, such as keys 64 or 107 will be set, and the work will be fed forward the distance for which the keys were so set, and the various functions and operations of the machine will be likewise controlled from said strip. Upon the completion of the punching and other operations, the distance record strip 1 will be again fed up and the operations repeated.

It will be understood that a machine has been provided embodying the principles and features of the invention, and realizing the objects and advantages set forth, together with other objects and advantages.

The invention, in its broader aspects, is not limited to the particular constructions shown, nor to any particular constructions by which it has been or may be carried into effect, as many changes may be made in the construction without departing from the main principles of the invention and without sacrificing its chief advantages.

What I do claim as my invention and desire to secure by Letters Patent, is:—

1. A machine for operating upon structural shapes including in combination tool-equipped means, means for progressing a shape widely varying successive distances relatively to the tool-equipped means, distance determining means for positioning the work relatively to the tool-equipped means through such widely varying successive distances to be operated upon thereby, and a distance record device governing the operation of said distance determining means.

2. A machine for operating upon structural beams including in combination tool-equipped means, and means for causing a beam to travel and stop relatively to the tool-equipped means to correctly position the beams for successive operations, said means including a distance record device adapted to feed and stop through irregular and widely varying distances and mechanism governed thereby to properly travel and stop the beam, and means for feeding the distance record device.

3. A machine for operating upon structural beams including in combination tool-equipped means, and means for causing a beam to travel and stop relatively to the tool-equipped means to correctly position the beams for successive operations, said means including a distance record device, a head traveling in fixed relation with the beam and mechanism automatically governed by the distance record device to stop the head and the beam in positions corresponding to the readings of the distance record device.

4. A machine for operating upon structural beams including in combination tool-equipped means, and means for causing a beam to travel and stop relatively to the tool-equipped means to correctly position the beams for successive operations, said means including a distance record device and mechanism governed thereby to successively stop the beam in accordance with the readings of the distance record device, said mechanism including a traveling head engaged by the forward end of the beam and stopped by the distance record device.

5. A machine for operating upon structural beams including in combination tool-equipped means, and means for causing a beam to travel and stop relatively to the tool-equipped means to correctly position the beams for successive operations, said means including a distance record device and mechanism governed thereby to automatically and successively properly travel and stop the beam.

6. A machine for operating upon structural shapes including in combination tool-equipped means, and means for causing a beam to travel and stop relatively to the tool-equipped means to correctly position the beams for successive operations, said means including a distance record device, mechanism governed thereby to properly travel and stop the beam, and means for feeding said distance record device.

7. A machine for operating upon structural beams including in combination tool equipped means, means for causing a beam to travel and stop relatively to the tool-equipped means to correctly position the beams for successive operations, said means including a series of rolls traveling the beam past the tool equipped means, a member engaging the beam and traveling therewith, a distance record device and mechanism governed thereby to successively stop the beam in accordance with the readings of the distance record device.

8. A machine for operating upon structural shapes including in combination tool-equipped means, means for causing a shape to travel and stop relatively to the tool-equipped means, including devices for stopping said shape to correctly position the shape for successive operations, said stopping means including a distance record device, and means for intermittently feeding said distance record device.

9. A machine for operating upon structural shapes including in combination tool-equipped means, means for causing a shape to travel through irregular and widely varying distances relatively to the tool-equipped means, means for stopping the shape to correctly position the shape for successive operations, said stopping means including a distance record device and means for automatically having distance controlling marks for distance values and sub-multiples in a plurality of denominations.

10. A machine for operating upon structural shapes including in combination tool-equipped means, means for causing a shape to travel through irregular and widely varying distances relatively to the tool-equipped means, means for stopping a shape to correctly position the shape for successive operations, said means including a distance record device having arbitrarily located distance indications.

11. A machine for operating upon structural shapes including in combination tool-equipped means, means for causing a shape to travel through irregular and widely varying distances relatively to the tool-equipped means, means for stopping a shape to correctly position the shape for successive operations, said means including a distance record device having arbitrarily located distance indications representing a plurality of distance denominations and sub-multiples thereof, and a device engaging the traveling beam and stopped successively by the distance record device in accordance with the successive readings thereof.

12. A machine for operating upon structural shapes including in combination tool-equipped means, and means for causing a beam to travel and stop relatively to the tool-equipped means to correctly position the beams for successive operations, said means including a distance record device having areas or locations representing distance denominations and sub-areas or locations representing ordinals of such denominations and distance indications selectively located within said areas, and mechanism governed thereby to properly travel and stop said beam.

13. A machine for operating upon structural shapes including in combination tool-equipped means, and means for causing a beam to travel and stop relatively to the tool-equipped means to correctly position the beam for successive operations, said means including a distance record device adapted to be fed or traveled and being divided transversely of its direction of travel into distance values and having a distance indication selectively located transversely of said device, and mechanism governed thereby to properly travel and stop the beam.

14. A machine for operating upon structural shapes including in combination tool-equipped means, and means for causing a beam to travel and stop relatively to the tool-equipped means to correctly position the beam for successive operations, said means including a distance record device adapted to be fed or traveled and being divided transversely of its direction of travel into distance values and having a distance indication selectively located transversely of said device, devices for successively feeding said device from one distance indication to the next in the direction of its feed, and mechanism governed thereby to properly travel and stop the beam.

15. A machine for operating upon structural shapes including in combination tool-equipped means, and means for causing a beam to travel and stop relatively to the tool-equipped means to correctly position the beam for successive operations, said means including a distance record device adapted to be fed or traveled and being divided transversely of its direction of travel into distance values and having a plurality of distance indications selectively located transversely of said device, and mechanism governed thereby to stop the beam after a travel equal to the total distance of the group of transverse distance indications.

16. A machine for operating upon structural shapes including in combination tool-equipped means, and means for causing a beam to travel and stop relatively to the tool-equipped means to correctly position the beam for successive operations, said means including a distance record device adapted to be fed or traveled along being divided transversely of its direction of travel into distance values and having a plurality of distance indications selectively located transversely of said device to stop the beam after a travel equal to the total distance of the group of transverse distance indications, devices for successively feeding said device from one transverse group of indications to the next transverse group of indications.

17. A machine for operating upon structural shapes including in combination tool-equipped means, and means for causing a beam to travel and stop relatively to the tool-equipped means to correctly position the beam for successive operations, said means including a distance record device adapted to be fed or traveled and having a distance reading or indication arranged transversely thereof and such transverse readings or indications successively arranged and substantially equally spaced along said device, irrespective of the distances represented thereby, means for feeding said record device, and mechanism governed thereby to properly travel and stop the beam.

18. A machine for operating upon structural shapes including in combination tool-equipped means, means for causing a shape to travel relatively to the tool-equipped means, and means for stopping a shape to correctly position the shape for successive operations, said stopping means including a previously prepared distance record device and mechanisms coöperating therewith to recognize the distance indications and to stop the shape accordingly.

19. A machine for operating upon structural shapes including in combination tool-equipped means, means for causing a shape to travel relatively to the tool-equipped means, and means for stopping a shape to correctly position the shape for successive operations, said stopping means including a previously prepared, removable and interchangeable, distance record device and mechanisms coöperating therewith and governed thereby to recognize the distance indications and to stop the shape accordingly.

20. A machine for operating upon structural shapes including in combination tool-equipped means, means for causing a shape to travel relatively to the tool-equipped means, including a series of driven rolls, and means for stopping the shape to correctly position the shape for successive operations, said stopping means including a previously prepared distance record device and a member engaging and traveling with the shape and connections therefrom operating to recognize the distance indications and to stop the shape accordingly.

21. A machine for operating upon structural shapes including in combination tool-equipped means, means for causing a beam to travel relatively to the tool-equipped means, and means for stopping the shape to correctly position the shape for successive operations, said stopping means including a previously prepared distance record device and a member pushed forward by the traveled beam and connections therefrom recognizing the distance indications of the distance record device to stop said member and the beam accordingly.

22. A machine for operating upon structural shapes, including in combination tool-equipped means, means for causing a beam to travel freely relatively to the tool equipped means, and means for stopping the shape to correctly position the shape for successive operations, said stopping means including a head pushed by the forward end of the traveling beam, an intermittently traveling sheet or strip having distance indications therein and mechanism recognizing said indications and governed thereby to stop said head and the shape in accordance with said indications.

23. A machine for operating upon structural shapes including in combination tool-equipped means, and means for traveling and stopping a shape relatively to said tool-equipped means to correctly position the shape for successive operations, said means comprising a sheet or strip having on a transverse line thereof a plurality of indications which together represent a single distance reading, mechanism coöperating with said indications to move and stop the shape in accordance therewith, and means for intermittently feeding said strip from one transverse line of indications to the next succeeding.

24. A machine for operating upon structural shapes, including in combination tool-equipped means, and means for causing a beam to travel and stop relatively to said tool-equipped means to correctly position the shape for successive operations, said means including a plurality of keys and automatic means for setting all the keys for a single distance reading and corresponding travel of the shape.

25. A machine for operating upon structural shapes, including in combination tool-equipped means, and means for causing a shape to travel and stop relatively to said tool-equipped means to correctly position the shape for successive operations, said means including a keyboard, a distance record device, and means for successively setting the keyboard in accordance with successive indications of the distance record device.

26. A machine for operating upon structural shapes, including in combination tool-equipped means, and means for causing a shape to travel and stop relatively to said tool-equipped means to correctly position the shape for successive operations, said means including a keyboard and a distance record device and means for simultaneously setting a plurality of keys to correspond to a single distance reading or indication of said distance record device.

27. A machine for operating upon structural shapes including in combination tool-equipped means, and means for causing a shape to travel and stop relatively to said tool-equipped means to correctly position the shape for successive operations, said means including a keyboard and a distance record strip having successive distance readings indicated thereon, and means between said strip and keyboard for simultaneously transferring to said keyboard all the indications for a complete reading or movement of the shape.

28. A machine for operating upon structural shapes, including in combination tool-equipped means, means for traveling a shape past said tool-equipped means, means for stopping the traveling shape in various positions to be operated upon by said tool-equipped means, and distance determining devices controlling said stopping means to determine the extent of travel, a distance record device and electrical means coöperating therewith to govern the stopping means in accordance with the indications of said distance record device.

29. A machine for operating upon structural shapes, including in combination tool-equipped means, means for freely traveling a shape past the tool-equipped means, and means for stopping the traveling shape in various predetermined positions relatively to the tool-equipped means to be perforated thereby, said stopping means including a distance record device and electrical devices coöperating therewith and governed thereby.

30. A machine for operating upon structural shapes, including in combination tool-equipped means, means for traveling a shape past the tool-equipped means, means for stopping the traveling shape in various predetermined positions relatively to the tool-equipped means to be perforated thereby, said stopping means including a distance record device having perforations therein indicating distance values and electrical devices coöperating with said perforations, a head traveling with and holding the shape, and connections whereby said electrical devices stop said head and the shape.

31. A machine for operating upon structural shapes including in combination tool-equipped means, and means for traveling and stopping a shape in various predetermined positions relatively to the tool-equipped means, said means including a perforated strip, and a plurality of electrical current carrying devices coöperating with said strip the current flow through a particular device being controlled by the presence or absence of a corresponding perforation in the strip.

32. A machine for operating upon structural shapes, including in combination tool-equipped means, and means for traveling and stopping a shape in various predetermined positions relatively to the tool-equipped means, said means including a perforated strip, and a plurality of electrical current carrying devices coöperating with said strip the current flow through a particular device being controlled by the presence or absence of a corresponding perforation in the strip, mechanical devices controlled by said electrical devices to stop the shape at a point corresponding to the distance indication of the perforations, and means for feeding said strip between successive operations of said tool-equipped means.

33. A machine for operating upon structural shapes, including in combination tool equipped means, means for traveling a shape past the tool equipped means, a member engaging and traveling with the shape, and distance determining devices for determining the extent of travel of the shape including electric current carrying devices, a sheet having perforations therein representing distances and permitting or preventing the current flow, and connections controlled by said electric current carrying devices for stopping said member and the shape.

34. A machine for operating upon structural shapes, including in combination tool-equipped means, means for traveling and stopping a shape in various predetermined positions relatively to said tool-equipped means, said means including settable distance determining devices, electrical devices for setting said distance determining devices, a plurality of current carrying devices connected to said electrical setting devices and a distance record device carrying distance indications making or breaking said current to control the setting of said distance determining devices.

35. A machine for operating upon structural shapes including in combination tool-equipped means, means for traveling and stopping a shape in various predetermined positions relatively to said tool-equipped means, said means including settable distance determining devices, electrical devices for setting said distance determining devices, a plurality of current carrying devices connected to said electrical setting devices and a sheet carrying distance indicating perforations for making and braking said currents to control the setting of said distance determining devices.

36. A machine for operating upon structural shapes including in combination tool-equipped means, means for traveling and stopping a shape in various predetermined positions to be operated upon by said tool-equipped means, said means including distance determining devices, having a keyboard, electrically operated devices for selectively setting said keyboard, a plurality of electric current carrying devices connected to said electrical setting devices and a sheet having distance determining perforations for permitting or preventing the flow of said currents.

37. A machine for operating upon structural shapes including in combination tool-equipped means, means for traveling and stopping a shape in various predetermined positions to be operated upon by said tool-equipped means, said means including distance determining devices having a keyboard, electrically operated devices for selectively setting said keyboard, a plurality of electric current carrying devices connected to said electrical setting devices and a sheet having groups of distance determining perforations, each group representing a single distance reading or feed of the shape, said perforations operating to permit or prevent the flow of said currents.

38. A machine for operating upon structural shapes, including in combination tool-equipped means, means for traveling and stopping a shape in various predetermined positions to be operated upon by said tool-equipped means, said means including distance determining devices having a keyboard, electrically operated devices for selectively setting said keyboard, a plurality of electric current carrying devices connected to said electrical setting devices and a sheet having groups of distance determining perforations, each group representing a single distance reading or feed of the shape, said perforations operating to permit or prevent the flow of said currents, and means for feeding said sheet from one group of said perforations to another, after the operation of the tool-equipped means upon the work.

39. A machine for operating upon structural shapes, including in combination tool-equipped means, and means for feeding and stopping the shape in various predetermined positions relatively to said tool-equipped means, said means comprising a member traveling proportionately to said shape, a plurality of stops representing distances and adapted to coöperate with said member and a distance record device automatically governing the action of said stops upon said traveling member.

40. A machine for operating upon structural shapes, including in combination tool-equipped means, and means for feeding and stopping the shape in various predetermined position relatively to said tool-equipped means, said means comprising a member traveling proportionately to said shape, a plurality of stops representing distances and adapted to coöperate with said member, and electrically operated means for actuating said stops.

41. A machine for operating upon structural shapes, including in combination tool-equipped means, and means for feeding and stopping the shape in various predetermined positions relatively to said tool-equipped means, said means comprising a member traveling proportionately to said shape, a plurality of stops representing distances and adapted to coöperate with said member, electrically operated means for actuating said stops and a distance record device for controlling said electrically operated means.

42. A machine for operating upon structural shapes, including in combination tool-equipped means, and means for feeding and stopping the shape in various predetermined positions relatively to said tool-equipped means, said means comprising a member traveling proportionately to said shape, a plurality of stops representing distances and adapted to coöperate with said member, a distance record device and connections therefrom to actuate said stops.

43. A machine for operating upon structural shapes, including in combination tool-equipped means, and means for feeding and stopping the shape in various predetermined positions relatively to said tool-equipped means, said means comprising a member traveling proportionately to said shape, a plurality of stops representing distances and adapted to coöperate with said member, a distance record device, connections therefrom to actuate said stops in accordance with the distance indications of said record, and means for intermittently feeding said record device for successive operations of said tool-equipped means.

44. A machine for operating upon structural shapes, including in combination tool-equipped means, and means for feeding and stopping the shape in various predetermined positions relatively to said tool-equipped means, said means comprising a plurality of members traveling in definite relation to said shape, a plurality of groups of distance representing stops each group coöperating with one of said traveling members, and automatic means for setting a stop in each of said groups.

45. A machine for operating upon structural shapes, including in combination tool-equipped means, and means for feeding and stopping the shape in various predetermined positions relatively to said tool-equipped means, said means comprising a plurality of members traveling in definite relation to said shape, a plurality of groups of distance representing stops each group coöperating with one of said traveling members, and automatic means for simultaneously setting a stop in each of said groups.

46. A machine for operating upon structural shapes, including in combination tool-equipped means, and means for feeding and stopping the shape in various predetermined positions relatively to said tool-equipped means, said means comprising a plurality of members traveling in definite relation to said shape, a plurality of groups of distance representing stops each group coöperating with one of said traveling members, and a distance record device and connections therefrom to said stops for setting a selected stop in each group as indicated by a distance indication on said record device.

47. A machine for operating upon structural shapes, including in combination tool-equipped means, and means for feeding and stopping the shape in various predetermined positions relatively to said tool-equipped means, said means comprising a plurality of members traveling in definite relation to said shape, a plurality of groups of distance representing stops each group coöperating with one of said traveling members, a distance record device and connections therefrom to said stops for setting a selected stop in each group as indicated by a distance indication on said record device, and means for feeding said distance record device between successive settings.

48. A machine for operating upon structural shapes, including in combination tool-equipped means, and means for feeding and stopping the shape in various predetermined positions relatively to said tool-equipped means, said means comprising a member traveling in definite relation to said shape, a plurality of stops representing distances and coöperating with said member, an electrically operated device for each of said stops, circuit connections for all of said electrically operated devices and a distance record device for selectively making and breaking said circuits according to its distance indications.

49. A machine for operating upon structural shapes, including in combination tool-equipped means, and means for feeding and stopping the shape in various predetermined positions relatively to said tool-equipped means, said means comprising a plurality of members traveling in definite relation to said shape, a group of distance representing stops for each of said traveling members, a plurality of electrically operated means for selectively setting a stop in each of said groups, circuit connections for all of said means, and a distance record device for selectively making and breaking said circuits according to its distance indications, and means for feeding said distance record device between successive settings of said stops.

50. A machine for operating upon structural shapes, including in combination tool-equipped means, and means for feeding and stopping the shape in various predetermined positions relatively to said tool-equipped means, said means comprising a plurality of members traveling in definite relation to said shape, a group of distance representing stops for each of said traveling members, a plurality of electrically operated means for selectively setting a stop in each of said groups, circuit connections for all of said means, and a sheet containing a group of perforations constituting a distance indication and constituting a selective make and break device for said circuits.

51. A machine for operating upon structural shapes, including in combination tool-equipped means, and means for feeding and stopping the shape in various predetermined positions relatively to said tool-equipped means, said means comprising a plurality of members traveling in definite relation to said shape, a group of distance representing stops for each of said traveling members, a plurality of electrically operated means for selectively setting a stop in each of said groups, circuit connections for all of said means, and said sheet containing groups of perforations, each group being a single distance reading or indication for said shape, and make and break devices in said circuits coöperating with said sheet and perforations, and means for feeding said sheet from one group of perforations to the next for successive operations of said tool-equipped means.

52. A machine for operating upon structural shapes, including in combination tool-equipped means, and means for feeding and stopping the shape in various predetermined positions relatively to said tool-equipped means, said means comprising a member traveling in definite relation to said shape, a plurality of stops representing distances and coöperating with said member, a key corresponding to each of said stops, a solenoid for operating each of said keys, a circuit for each solenoid, and a distance record device for making or breaking said circuits in accordance with its distance indications.

53. A machine for operating upon structural shapes, including in combination means for traveling a shape along a pathway, a plurality of tool-equipped means located at different points longitudinally along said pathway, means for stopping a shape in various predetermined positions in said pathway, and automatic means for so stopping the shape with respect to either of said tool-equipped means.

54. A machine for operating upon structural shapes including in combination means for traveling a shape along a pathway, a plurality of tool-equipped means located at different points along said pathway, means for stopping a shape in various predetermined positions in said pathway, and a distance record device for stopping a shape in a desired position with respect to either tool-equipped means.

55. A machine for operating upon structural shapes including in combination means for traveling a shape along a pathway, a plurality of tool-equipped means located at different points along said pathway, means for stopping a shape in various predetermined positions in said pathway, and a distance record device for stopping a shape in a desired position in accordance with the distance indications of said record device and with respect to either tool-equipped means.

56. A machine for operating upon structural shapes including in combination means for traveling a shape along a pathway, a plurality of tool-equipped means located at different points along said pathway, means for stopping a shape in various predetermined positions in said pathway, and a distance record device having a distance indication or reading for the amount of travel of the shape, and an indication for a particular tool-equipped means.

57. A machine for operating upon structural shapes including in combination means for traveling a shape along a pathway, a plurality of tool-equipped means located at different points along said pathway, means for stopping a shape in various predetermined positions in said pathway, and a distance record device having a group of perforations therein for the amount of travel of the shape and a perforation selecting one of said tool-equipped means.

58. A machine for operating upon structural shapes including in combination tool-equipped means, means for traveling and stopping the work in various predetermined positions with respect to said tool-equipped means, a distance record device coöperating with said traveling and stopping means to so position said shape in accordance with the readings or indications of said distance record device, said distance record device also comprising means for controlling the operation of said tool-equipped means.

59. A machine for operating upon structural shapes including in combination a plurality of tool-equipped means for operating upon a shape, means for traveling and stopping the work in various predetermined positions with respect to said tool-equipped means, a distance record device coöperating with said traveling and stopping means to so position said shape in accordance with the readings or indications of said distance record device, said distance record device also having means for selectively causing a particular tool-equipped means to operate upon the work.

60. A machine for operating upon structural shapes including in combination a plurality of tool-equipped means for operating upon a shape and located at various points longitudinally of the path of travel of the shape, means for traveling and stopping the work in various predetermined positions with respect to said tool-equipped means, and a record sheet automatically coöperating with said tool-equipped means to select one of said tool-equipped means to operate upon the work.

61. A machine for operating upon structural shapes, including in combination tool-equipped means, means for traveling the shape in a path past said tool-equipped means, distance determining devices settable to stop the shape at corresponding points in its path to be operated upon by said tool-equipped means, a distance record device for calling the tool-equipped means into operation after a complete setting of the distance determining means has been made.

62. A machine for operating upon structural shapes, including in combination tool-equipped means, means for traveling the shape in a path past said tool-equipped means, distance determining devices settable to stop the shape at corresponding points in its path to be operated upon by said tool-equipped means, a distance record device for automatically setting a distance reading on said distance determining device and for calling the tool-equipped means into action after said setting has been made and the shape correspondingly positioned.

63. A machine for operating upon structural shapes, including in combination tool-equipped means adapted to travel relatively to the shape, settable distance determining means for controlling such travel of the tool-equipped means, and a removable and interchangeable distance record device for automatically setting said distance determining device.

64. A machine for operating upon structural shapes, including in combination tool-equipped means, means for moving the shape and tool-equipped means relatively to each other longitudinally and transversely, distance determining devices for determining the amount of such relative travel in both directions, and a distance record device controlling said distance determining devices.

65. A machine for operating upon structural shapes including in combination tool-equipped means, and means for feeding and stopping the shape in various predetermined positions relatively to said tool-equipped means, said means comprising a plurality of members traveling in definite relation to said shape, a group of distance representing stops for each of said traveling members, a plurality of electrically operated means for selectively setting a stop in each of said groups, circuit connections for all of said means, a distance record device for selectively making and breaking said circuits according to its distance indications, and means for feeding said distance record device between successive operations of said tool-equipped means.

66. A machine for operating upon structural shapes including in combination tool equipped means, means for traveling the shape past said tool equipped means, means for stopping the shape, said stopping means including a head engaging the forward end of the shape and a distance record device governing the movement of said head.

67. A machine for operating upon structural shapes, including in combination a plurality of tool equipped means, means for traveling the shape longitudinally relatively to said tool equipped means, means for effecting transverse relative travel between the shape and one of said tool-equipped means, and distance record means for controlling said travel to position the shape to be operated on by the tool-equipped means.

68. A machine for operating upon structural shapes, including in combination a plurality of tool-equipped means, means for traveling the shape longitudinally relatively to said tool-equipped means, means for effecting transverse relative travel between the shape and one of said tool equipped means, and distance determining means including a perforated distance record sheet for controlling said travel to position the shape to be operated on by the tool-equipped means.

69. A machine for operating upon structural shapes, including in combination a plurality of tool equipped means, means for positioning the shape to be operated upon by said plurality of tool-equipped means, including a distance determining device for one tool-equipped means, a distance determining device for another tool equipped means and a single distance record device controlling both said distance determining devices.

In testimony whereof, I have signed my name to this specification, in the presence of two subscribing witnesses.

THEODORE P. PAYNE.

Witnesses:
 JOHN D. MORGAN,
 MARGARET WALSH.